(12) United States Patent
Yang et al.

(10) Patent No.: US 12,048,049 B2
(45) Date of Patent: Jul. 23, 2024

(54) DIFFERENTIATED DISCONTINUOUS RECEPTION BASED ON NETWORK SERVICES

(71) Applicant: VERIZON PATENT AND LICENSING INC., Basking Ridge, NJ (US)

(72) Inventors: Jin Yang, Orinda, CA (US); Susan Wu Sanders, Bridgewater, NJ (US); Frank Jager, Chester, NJ (US); John Joseph Cooke, Algonquin, IL (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 294 days.

(21) Appl. No.: 17/387,087

(22) Filed: Jul. 28, 2021

(65) Prior Publication Data

US 2023/0036778 A1 Feb. 2, 2023

(51) Int. Cl.
*H04W 76/28* (2018.01)
*H04W 28/02* (2009.01)
*H04W 48/18* (2009.01)
*H04W 60/04* (2009.01)

(52) U.S. Cl.
CPC ....... *H04W 76/28* (2018.02); *H04W 28/0268* (2013.01); *H04W 48/18* (2013.01); *H04W 60/04* (2013.01)

(58) Field of Classification Search
None
See application file for complete search history.

(56) References Cited

U.S. PATENT DOCUMENTS

| | | | |
|---|---|---|---|
| 2018/0070406 A1* | 3/2018 | Chen | H04W 24/02 |
| 2018/0234919 A1* | 8/2018 | Tsuda | H04W 88/04 |
| 2019/0268422 A1* | 8/2019 | Yu | H04W 76/10 |
| 2020/0305211 A1* | 9/2020 | Foti | H04L 65/1073 |
| 2022/0248331 A1* | 8/2022 | Jia | H04W 76/28 |
| 2023/0102021 A1* | 3/2023 | Runeson | H04W 4/60 |
| | | | 370/329 |
| 2023/0145687 A1* | 5/2023 | Turtinen | H04W 48/18 |
| | | | 370/329 |
| 2023/0199716 A1* | 6/2023 | Xu | H04W 52/0235 |
| | | | 370/329 |
| 2023/0217240 A1* | 7/2023 | Jung | H04W 8/186 |
| | | | 455/422.1 |
| 2023/0224704 A1* | 7/2023 | Atarius | H04W 12/12 |
| | | | 726/6 |
| 2023/0224936 A1* | 7/2023 | Yu | H04W 72/0457 |
| | | | 370/329 |

* cited by examiner

*Primary Examiner* — Mariela Vidal Carpio (57) ABSTRACT

An improved discontinuous reception (DRX) mechanism is disclosed. In one embodiment, a method is disclosed comprising receiving a request to attach to a cellular network from user equipment (UE). The method then identifies a group identifier associated with the UE and determines a DRX parameter based on the group identifier. Finally, the method transmits the DRX parameter to the UE.

20 Claims, 6 Drawing Sheets

DIFFERENTIATED DISCONTINUOUS RECEPTION BASED ON NETWORK SERVICES

BACKGROUND INFORMATION

Discontinuous reception (DRX) plays an important role in optimizing throughput and latency, and it may also factor into the thermal and battery life of user equipment (UE). During DRX, a UE may negotiate data transfer phases with a cellular network. During the phases where the UE does not expect data transmission, the UE can disable a cellular transceiver, thus reducing power consumption and entering a low power state.

DETAILED DESCRIPTION OF EXAMPLE EMBODIMENTS

In the embodiments, a single shared identifier can be associated with a UE in both non-standalone (NSA) and standalone (SA) cellular architectures. In an embodiment, the UE can be grouped based on subscriber profile identifier (SPID) values in an NSA environment. In an embodiment, the SPID can be used as a network slicing identifier in an NSA environment. Similarly, in an SA environment, the SPID value can be used in Single Network Slice Selection Assistance Information (S-NSSAI). In some embodiments, the value of the SPID in an NSA environment can correspond to a unique S-NSSAI value used in the SA environment. Thus, regardless of the network architecture used (e.g., NSA versus SA), the embodiments can group UEs or subscribers based on a unique identifier.

In an embodiment, each group of UEs can be associated with one or more services. The disclosure places no limit on the type of services; however, examples include Internet-of-Thing (IoT) services, smartphone/tablet services, smart sensor services, etc. In general, a service can comprise a set of capabilities or functions supported by UE.

In the embodiments, a cellular network can associate a given group of services with a corresponding DRX policy. Thus, in an embodiment, the cellular network can define group-level connected mode DRX (cDRX) and idle mode DRX policies based on the services.

In an embodiment, the cellular network can adjust an idle mode DRX policy based on group identifiers. Thus, each unique group of UEs can utilize an independent idle mode DRX policy. In an embodiment, the cellular network can adjust idle mode DRX configurations while the UE is in radio resource control (RRC) IDLE mode in both NSA and SA environments. For example, the cellular network can configure users of a smartphone user group and IoT group with different idle mode DRX configurations. Specifically, the cellular network can configure the IoT group to have a very short DRX cycle to achieve low latency. By contrast, the cellular network can configure the smartphone user group to have a longer DRX cycle to preserve battery life.

Similarly, in an embodiment, the cellular network can enable, disable, or adjust a cDRX policy per QoS Class Identifier (QCI) values in a given group. Examples of this operation include adjusting a cDRX profile to obtain a bounded latency, defining separate inactivity timers for NSA and SA networks, defining default cDRX profiles to meet key performance indicators. For example, for smartphone users associated with a corresponding group, voice cDRX and internet gaming cDRX can be further differentiated within the group based on the QCI.

In the various embodiments, methods, devices, and computer-readable media are disclosed to provide differentiated DRX parameters to UE. A mobility manager may receive attach requests from UE and may identify a group identifier associated with the UE. In one embodiment, the group identifier can be a Subscriber SPID or S-NSSAI. In one embodiment, group identifiers may be mapped to UE by mapping unique identifiers of the UE to group identifiers.

Next, the mobility manager may determine a DRX parameter based on the group identifier. The DRX parameter can comprise an idle-mode or connected-mode DRX parameter. If determining a connected-mode DRX parameter, the mobility manager can further determine a QCI value associated with the UE. In such an embodiment, the mobility manager may determine the DRX parameter based on the group identifier and the QCI value. Finally, the mobility manager may transmit the DRX parameter to the UE.

Figure 1:
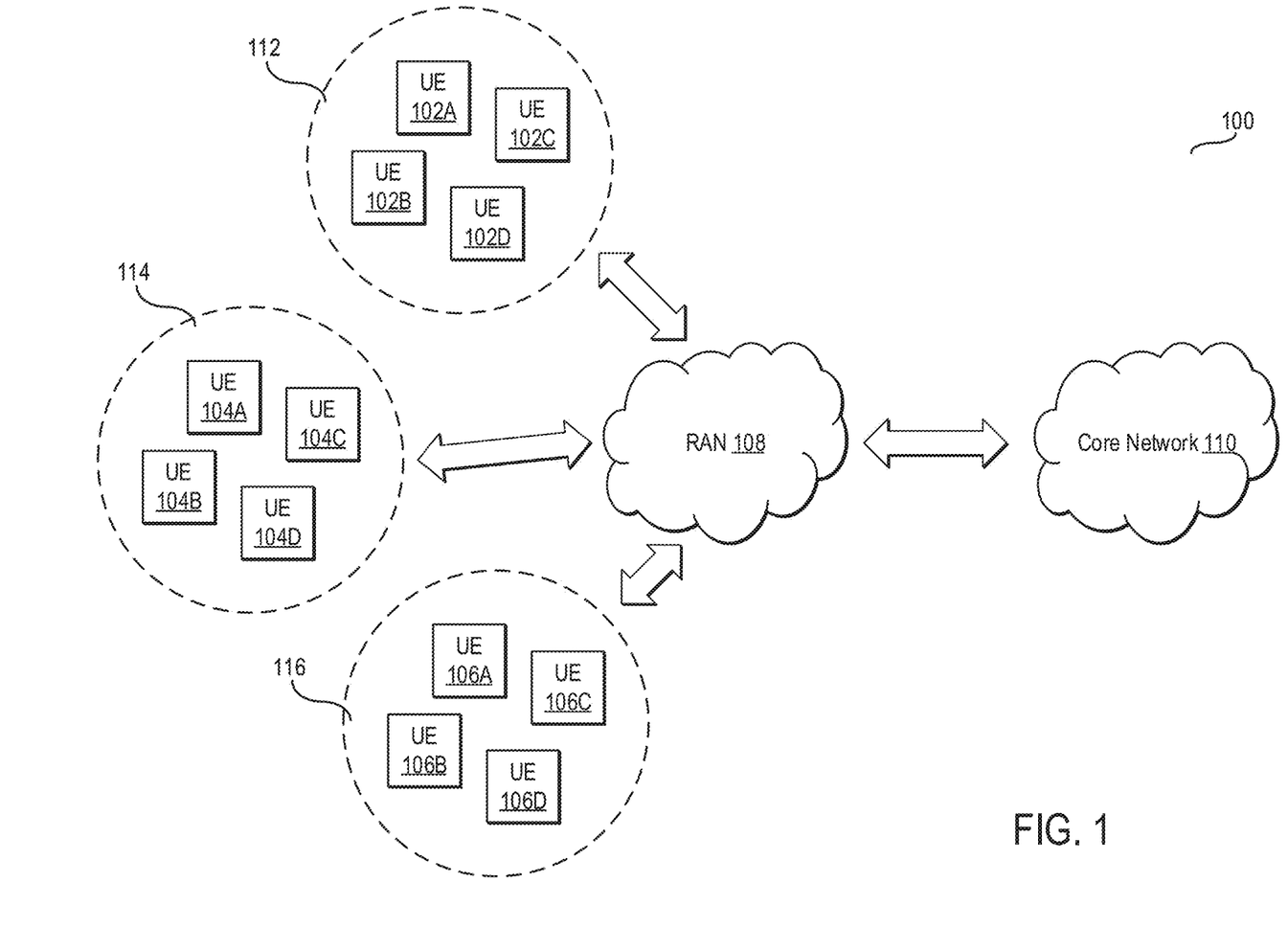
FIG. 1 is a block diagram of a cellular network providing differentiated DRX based on network services according to an embodiment.

FIG. 1 is a block diagram of a cellular network 100 providing differentiated DRX based on network services according to an embodiment.

As illustrated, UE 102A-102D, 104A-104D, and 106A-106D are communicatively coupled to a core network 110 via a radio access network, RAN 108. No limit is placed on the type of UE in the cellular network 100. As illustrated, UE 102A-102D, 104A-104D, and 106A-106D are grouped or sliced into three groups 112, 114, and 116. In one embodiment, the groups 112, 114, and 116 comprise groups determined based on the types of services required by the UE 102A-102D, 104A-104D, and 106A-106D. For example, UE in group 112 can comprise Ultra-Reliable Low Latency Communications (URLLC) devices such as autonomous vehicle computing devices, IoT devices, remote surgery devices, etc.; UE in group 114 can comprise enhanced mobile broadband (eMBB) devices such as smartphones, tablets, etc.; and UE in group 116 can comprise Massive Machine-Type Communications (mMTC) devices such as sensors, meters, and monitoring devices. Such groups are exemplary only, and other groupings can be used. As discussed in more detail below, each of the UE 102A-102D, 104A-104D, and 106A-106D can support DRX based on parameters received from the RAN 108.

In one embodiment, RAN 108 comprises a plurality of base stations. Some of these base stations can comprise 4G base stations, such as eNodeB base stations, while others can comprise 5G base stations, such as gNodeB base stations. In one embodiment, a given UE can connect to a 4G base station or a 5G base station. In some embodiments, a given UE can connect to both a 4G base station and a 5G base station in a dual connectivity setup. In such a setup, the UE may use the 4G base station for control plane traffic, while the UE can use the 5G base station for user plane traffic. In one embodiment, the UE within a single group may use different radio access technologies. For example, UE 102A can connect to the RAN 108 via a 4G base station, while UE 102B can connect to the RAN 108 via a 5G base station. As such, each UE within a group can be providing the same services yet connecting to differing base station types.

In alternative embodiments, the RAN 108 is communicatively coupled to a core network 110. In one embodiment, the core network 110 can comprise a homogenous network. For example, the core network 110 can comprise an LTE core network. Alternatively, the core network 110 can comprise a 5G core network. In one embodiment, the core network 110 can comprise two networks, such as an LTE core network and a 5G core network.

As discussed above, since UE can move among both 4G and 5G base stations, such UE may transition between NSA and SA network architectures. Nevertheless, the UE require the same DRX configurations across such networks regardless of the transition. As discussed in the following methods, the embodiments provide techniques for grouping UE across NSA and SA architectures and configured DRX parameters across the same.

Figure 2:
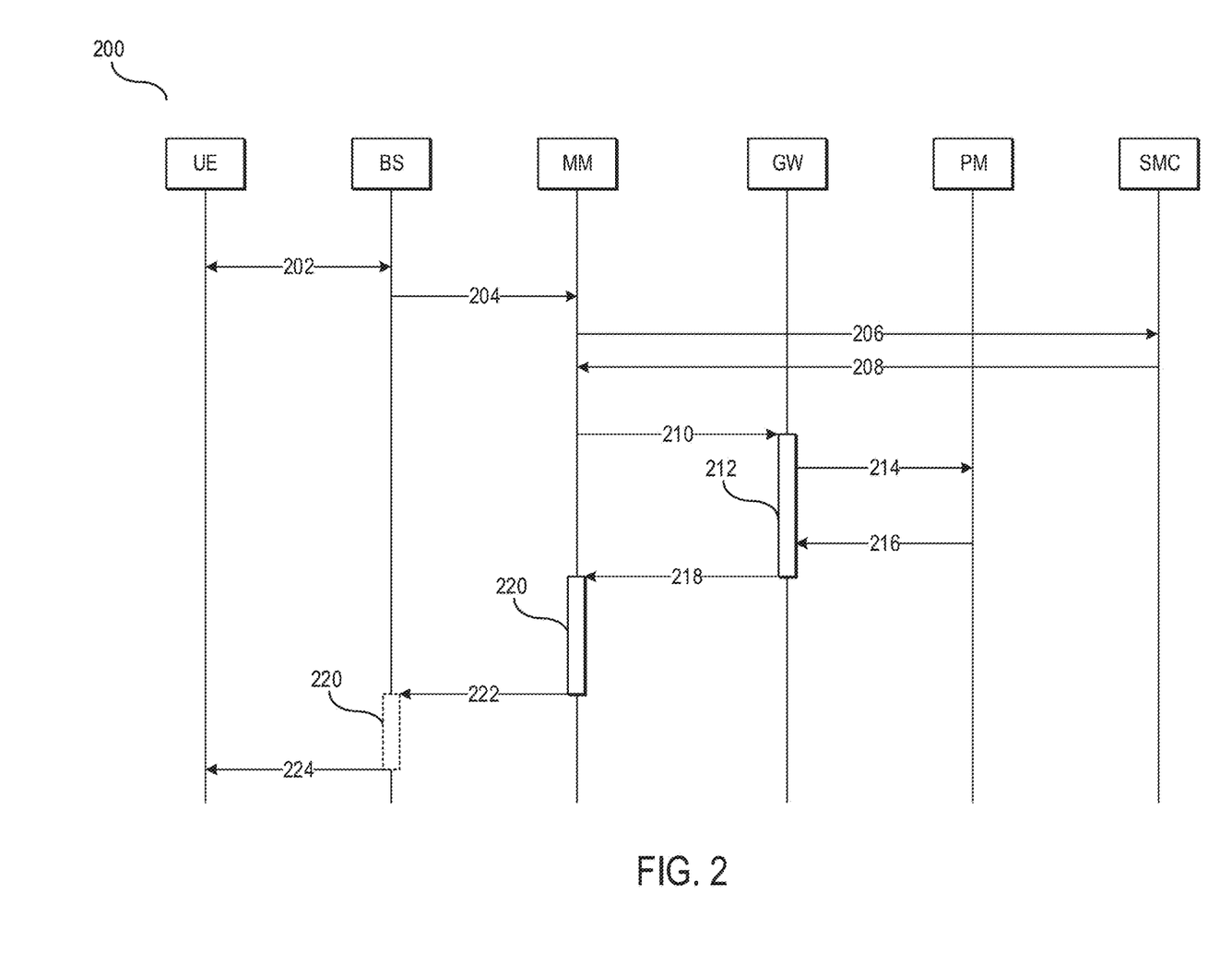
FIG. 2 is a call flow diagram illustrating a method for providing service differentiated DRX according to an embodiment.

FIG. 2 is a call flow diagram illustrating a method for providing service differentiated DRX according to an embodiment.

In step 202, method 200 can comprise establishing a radio resource control (RRC) connection between a UE and a base station (e.g., an eNodeB). In an embodiment, a 5G or 4G connection setup procedure can be implemented. For example, in one embodiment, step 202 can include a UE issuing an RRC connection request to the base station. In response, the base station can return an RRC connection setup message to the UE. The UE can then transmit an RRC connection setup complete message to confirm the connection. The specific details of an RRC connection setup are not provided in detail herein for the sake of clarity.

In step 204, method 200 can comprise a base station issuing an attach request to a mobility manager such as a Mobility Management Entity (MME) or Access and Mobility Management Function (AMF). In one embodiment, the attach request comprises an attach request message included by the UE in the RRC connection setup complete message. The attach request message can include various Information Element (IE) fields such as Evolved Packet System (EPS) attach type, EPS mobile identity, UE network capabilities, EPS Session Management message containers, etc. Additional fields can be included. In one embodiment, the attach request message can further include one or more DRX parameters. These DRX parameters can comprise the preferred DRX settings of a given UE and can include parameters such as an inactivity timer (the number of consecutive PDCCH-subframes for which the UE should be Active after successfully decoding a PDCCH indicating a new transmission), a short DRX cycle length, a long DRX cycle length, a short DRX cycle timer, an "on" duration timer, a Hybrid Automatic Repeat Request (HARQ) Round Trip Time (RTT) timer, a retransmission timer, etc. In some embodiments, the DRX parameters can comprise any other relevant DRX timers implemented by the network.

In step 206, method 200 can include the mobility manager issuing an update location request to a subscriber management component. In some embodiments, prior to step 206, the UE may authenticate itself with the subscriber management component. In an embodiment, the update location request informs the SMC of the location of the UE and, more specifically, the identity of the mobility manager servicing the UE. The update location request message can include an International Mobile Subscriber Identity (IMSI) of the UE, supported features of the mobility manager or UE, radio access type (RAT) details, and various other IEs. The update location request can include other fields as necessitated by the network, and detail on such standard fields are not provided herein for the sake of clarity.

In step 208, method 200 can comprise the mobility manager receiving an update location answer. In an embodiment, the update location answer can include various IEs, including, but not limited to, a list of supported features, a result code, various flags, and subscription data. The update location answer can include other fields as necessitated by the network.

In one embodiment, the subscription data can include a group identifier. In one embodiment, the group identifier can comprise a subscription profile identifier (SPID). In one embodiment, the subscription data includes the SPID of a given subscriber. In one embodiment, the SPID can be stored in a RAT-Frequency-Selection-Priority-ID IE. In one embodiment, a SPID value can be utilized if the UE establishes an RRC connection with a 4G RAN. Alternatively, or in conjunction with the foregoing, the group identifier can comprise an s-Network Slice Selection Assistance Information (NSSAI) value. In one embodiment, a SPID value can be utilized if the UE establishes an RRC connection with a 5G RAN.

Notably, in an embodiment, the UE can be communicatively coupled to either a 4G or 5G RAN. In one embodiment, the core network comprises a 5G core network. Thus, when the UE is connected to the 4G RAN, the UE is connected in an NSA mode while, when connected to the 5G RAN, the UE is connected in an SA mode. In one embodiment, the SMC ensures that the value of the SPID and the NSSAI are the same. That is, the group identifier is the same for a given UE regardless of the RAN. Thus, even as a UE transitions between NSA and SA modes, the same group identifier can be transmitted from the SMC to the mobility manager as part of the update location answer.

In one embodiment, the SMC maintains a mapping of IMSI ranges to SPID (or NSSAI) values and other values such as QCI values. Although IMSI values are discussed, any unique identifier of a UE can be used. As one example, for a 15-digit IMSI, the last nine digits can be used to group UEs (as the first six digits are used to identify the country and mobile network operator). Thus, these last nine digits can further be segmented into finer-grained groupings. For example, the first five digits can be used to identify a grouping of UEs, while the last four digits can be used to refine the DRX parameters within a grouping.

For example, an IMSI format of 311480AAAAABBBB is provided as an example. The digits "311" and "480" refer to the country code and mobile network, respectively. The placeholder "AAAAA" refers to a grouping of UEs (e.g., to URLLC devices or eMBB devices), while the placeholder "BBBB" further delineates a sub-group within the initial group (e.g., eMBB devices requiring low latency vs. devices not requiring low latency). In one embodiment, the IMSI values are assigned by the mobile network operator and thus can be deterministically applied to all UEs accessing the network.

Although the above matching technique is applied, other techniques can be utilized. For example, a database of IMSIs can be maintained such that each unique IMSI is associated with a SPID or other value (e.g., QCI). In such an embodiment, when the SMC receives an IMSI, it can consult a lookup table to identify the appropriate values.

Thus, after step 208, the mobility manager obtains a group identifier of the UE from the subscription management component. As discussed next, this group identifier can be used during session creation and ultimately used to established per-group DRX parameters. In one embodiment, after step 208, the mobility manager stores the returned group identifier and associates the group identifier with the UE for later usage.

In step 210, method 200 can include the mobility manager issuing a create session request to a gateway. In response, the gateway performs a session creation function in step 212.

In one embodiment, the gateway can comprise a packet gateway. In one embodiment, the mobility manager can transmit a create session request to a serving gateway which in turn transmits a create session request (e.g., default bearer request) to the packet gateway. In one embodiment, as part of step 212, the packet gateway authenticates the subscriber via an Authentication Authorization Request (AAR) message sent to an authentication component. The authentication component retrieves the subscriber profile from the SMC, authenticates the user, and returns an Authentication Authorization Answer (AAA) message to the packet gateway.

In step 214, as part of the session creation function, the gateway transmits a session establishment message to the policy manager (PM). In one embodiment, the session establishment can comprise an IP-CAN Control Session Procedure message. In one embodiment, the PM performs policy control functionality in the core network, including, but not limited to, QoS authorization (e.g., QCI generation and bit rate determination) that decides how a certain data flow will be treated. In one embodiment, the PM communicates with the SMC to retrieve the subscriber profile. As discussed above, in one embodiment, the subscriber profile may include a QCI associated with an IMSI range. Thus, in one embodiment, step 214 includes transmitting the IMSI to obtain the subscriber profile and defined QCI value. In one embodiment, PM can obtain this data via Subscribe-Notifications-Request (SNR), and Subscribe-Notifications-Answer (SNA) messages exchanged between the PM and SMC.

In step 216, the PM returns the QCI value identified based on the IMSI. In one embodiment, the QCI value can be provided as part of an IP-CAN Control Session Establishment message. In response, in step 218, the gateway can forward this QCI value to the mobility manager via, for example, a create session response. Thus, when establishing a data session, the mobility manager will receive the session establishment parameters as well as the QCI value associated with a UE's IMSI. As with the group identifier, the mobility manager can store this QCI value and associate the QCI value with the UE. At the conclusion of step 218, the mobility manager stores both a group identifier (e.g., SPID) and a QCI value for a given UE.

In step 220, the mobility manager generates or retrieves a DRX profile based on the group identifier. In some embodiments, the mobility manager can additionally use the QCI value to retrieve or generate a DRX profile. In one embodiment, the mobility manager uses the group identifier/QCI to query a database of DRX profiles. In this embodiment, an external database maintains an associate of group identifiers (and QCI values) to DRX parameters (described above). This external database can expose an application programming interface (API) to allow the mobility manager to retrieve the relevant DRX parameters based on the group identifier and QCI value.

In step 222, the mobility manager transmits the DRX parameters to the base station. In response, the base station updates the DRX handling for the given UE and, in step 224, transmits the DRX parameters to the UE. In one embodiment, a base station can transmit the DRX parameters to the UE as part of an RRC reconfiguration message. In response, the UE updates its DRX configuration (e.g., long/short timers, etc.) based on the received configuration data.

In an optional embodiment, step 220 can be performed by the base station. In such an embodiment, the mobility manager transmits the group identifier and (if applicable) the QCI to the base station, and the base station can perform step 220, as previously discussed. In one embodiment, a combination can be implemented. For example, when a UE is in RRC idle mode, the mobility manager can define the DRX parameters. Conversely, when the UE is in RRC connected mode, the base station may determine the DRX parameters.

In one embodiment, the group identifier can be used to identify or generate the DRX profile. In such an embodiment, the QCI value may not be used. In such an embodiment, the UE may be in RRC idle mode. In another embodiment, the group identifier and QCI value can both be used to identify the DRX profile. In such an embodiment, the UE may be in RRC connected mode.

Figure 3:
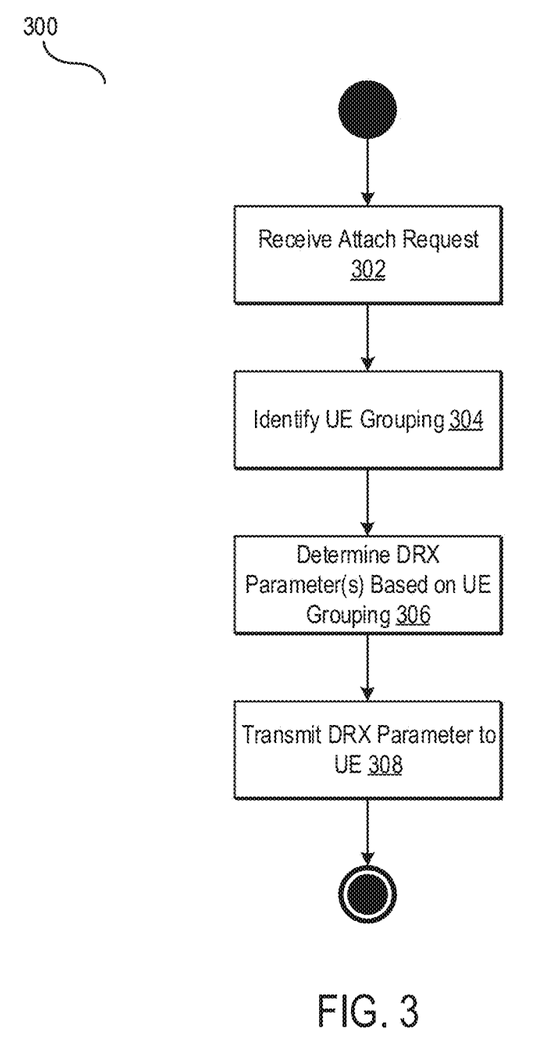
FIG. 3 is a flow diagram illustrating a method for providing service differentiated DRX according to an embodiment.

FIG. 3 is a flow diagram illustrating a method for providing service differentiated DRX according to an embodiment.

In step 302, method 300 can comprise receiving a request to attach to a cellular network from user equipment (UE).

In one embodiment, the request to attach comprises an attach request message included by the UE in the RRC connection setup complete message. The attach request message can include various IE fields such as EPS attach type, EPS mobile identity, UE network capabilities, EPS Session Management message containers, etc. Additional fields can be included. In one embodiment, the attach request message can further include one or more DRX parameters. These DRX parameters can comprise the preferred DRX settings of a given UE and can include parameters such as an inactivity timer (the number of consecutive PDCCH-subframes for which the UE should be Active after successfully decoding a PDCCH indicating a new transmission), a short DRX cycle length, a long DRX cycle length, a short DRX cycle timer, an "on" duration timer, a HARQ RTT timer, a retransmission timer, etc. In some embodiments, the DRX parameters can comprise any other relevant DRX timers implemented by the network.

In step 304, method 300 can comprise identifying a group identifier associated with the UE.

In one embodiment, method 300 extracts an IMSI from the attach request and includes the IMSI of the UE in an update location request message issued to an SMC. In response, the SMC retrieves the group identifier based on the IMSI and returns the IMSI to method 300. In one embodiment, the group identifier comprises one of a SPID or S-NSSAI. Details of this operation are provided in steps 206 and 208 of FIG. 2, which are not repeated herein again in detail.

In another embodiment, method 300 may maintain a mapping of IMSI values to group identifiers. In such an embodiment, method 300 need not obtain the group identifier from an external computing device and may instead retrieve the group identifier itself.

In one embodiment, the group identifier can be maintained across NSA and SA networks. Specifically, since the group identifier is keyed off of an IMSI or similar value unique to a UE, the corresponding group identifier can be applied a UE regardless of the type of network attached to. Further, UE in the same group can be provided the same DRX profile regardless of the type of network attached to.

In addition to a group identifier, in some embodiments, method 300 can obtain a QCI value associated with the UE (and IMSI). In one embodiment, method 300 can obtain the QCI value during session establishment with a policy manager such as a PCRF.

In another embodiment, method 300 can alternatively identify a network slice to assign the UE based on the IMSI value of the UE. In such an embodiment, a corresponding network slice can be determined based on the IMSI, the corresponding network slice being associated with DRX parameters. In this manner, the method 300 can automatically identify DRX parameters during a network slicing assignment.

In step 306, method 300 can comprise determining at least one discontinuous reception (DRX) parameter based on the group identifier.

In one embodiment, the DRX parameter can comprise one or both of an idle-mode DRX parameter or a connected mode DRX parameter. In one embodiment, method 300 can select an idle- or connected-mode DRX parameter based on the RRC state associated with a given UE. In one embodiment, method 300 can comprise querying a data store of DRX profiles based on the group identifier. The DRX data store can store profiles including DRX parameters for a given group identifier. In one embodiment, method 300 can retrieve these profiles and provide the corresponding DRX parameters to the UE.

As one example, method 300 can determine a DRX activity timer value based on the group identifier and monitored data of the UE. As used herein, an activity timer refers to the amount of time before a UE transitions to an idle state. In one embodiment, a base station can detect inactivity of the UE by monitoring the user plane activity of a UE (e.g., via gNB-CU-User Plane of a gNodeB or packet processing function of an eNodeB). In response, the inactivity time is configured via the control plane of the base station (e.g., gNB-CU-Control Plane of a gNodeB or radio control function of an eNodeB) and the data plane receives the inactivity timer value using the UE Inactivity Timer IE. In one embodiment, the base station can adjust the DRX parameter associated with a given group identifier or QCI value based on the per-UE inactivity measurements. Thus, in addition to the group-wise DRX parameters, each UE and each DRX parameter can be adjusted on a per-UE basis using the above approach.

In step 308, method 300 can comprise transmitting the DRX parameter to the UE.

In one embodiment, method 300 can comprise transmitting the DRX parameter to the UE via a base station. In response, the base station transmits the DRX parameter to the UE via an RRC reconfiguration message. In one embodiment, method 300 can alternatively comprise transmitting the group identifier (and, if applicable, the QCI value) to the base station, wherein the base station can perform step 306.

Figure 4:
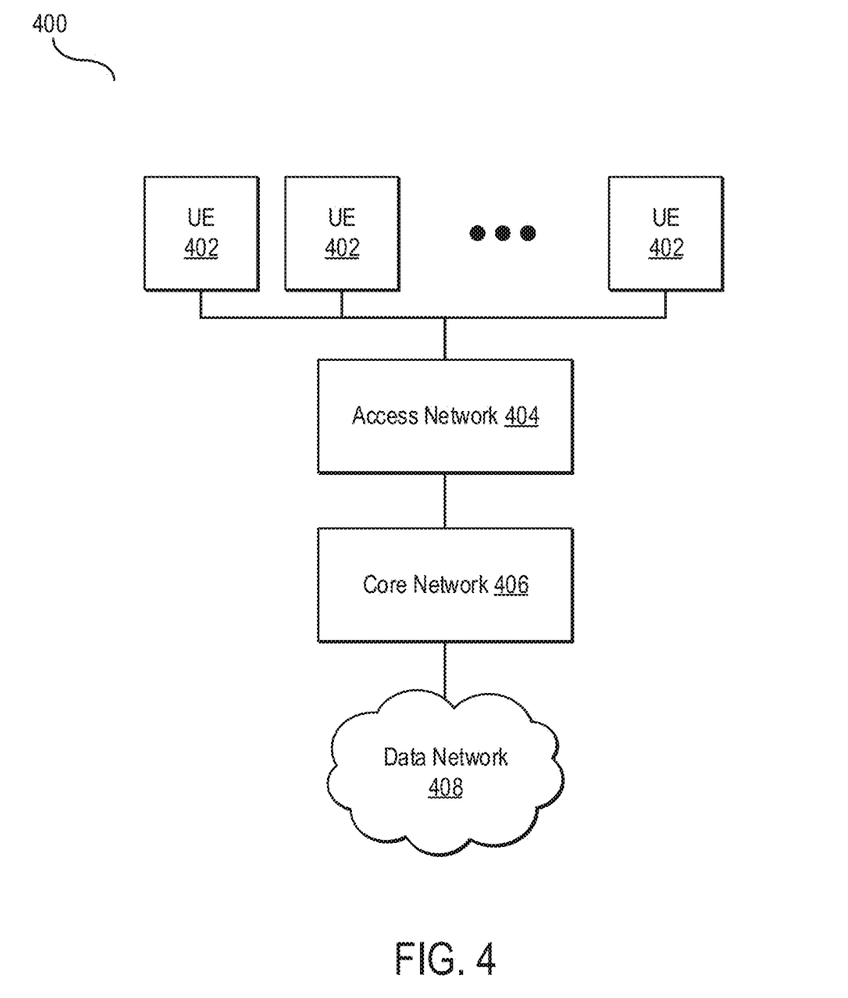
FIG. 4 is a block diagram of a cellular network according to some embodiments.

FIG. 4 is a block diagram of a cellular network according to some embodiments.

As illustrated, a system 400 includes UE 402 that accesses a data network 408) via an access network 404 and a core network 406. In the illustrated embodiment, UE 402 comprises any computing device capable of communicating with the access network 404. As examples, UE 402 may include mobile phones, smartphones, tablets, laptops, sensors, Internet of Things (IoT) devices, and any other devices equipped with a cellular transceiver. One example of a UE is provided in FIG. 6.

In the illustrated embodiment, the access network 404 comprises a network allowing over-the-air network communication with UE 402. In general, the access network 404 includes at least one base station that is communicatively coupled to the core network 406 and wirelessly coupled to UE 402.

In one embodiment, the access network 404 comprises a fifth-generation (5G) cellular access network. In one embodiment, the access network 404 and UE 402 comprise a NextGen Radio Access Network (NG-RAN). In an embodiment, the access network 404 includes a plurality of next Generation Node B (gNodeB) base stations connected to UE 402 via an air interface. In one embodiment, the air interface comprises a New Radio (NR) air interface. In some embodiments, an NR interface utilizes a Cyclic Prefix Orthogonal Frequency-Division Multiple Access (CP-OFDM) downlink modulation scheme and either CP-OFDM or Discrete Fourier Transform Spread Orthogonal Frequency Division Multiplexing (DFT-s-OFDM) uplink modulation scheme. In these embodiments, the gNodeB provides all functionality to implement and operate the air interface and negotiates uplinks and downlinks with the UE 402. The gNodeB may additionally include multiple network interfaces for communicating with the core network 406. In one embodiment, the gNodeB includes an interface to communicate with a mobility manager (e.g., an AMF) and a second interface to communicate with one or more gateway elements in the core network 406, such as an SMF for control data or a UPF for user data. In one embodiment, the mobility manager manages control plane traffic while the gateway elements manage user data traffic, as will be discussed. In some embodiments, base stations in the access network 404 are communicatively connected. For example, in a 5G network, individual gNodeB devices can be communicatively coupled via an X2 interface.

In one embodiment, the access network 404 comprises a fourth-generation (4G) cellular access network. In some embodiments, the access network 404 comprises an LTE access network. In one embodiment, the access network 404 and UE 402 comprise an Evolved Universal Mobile Telecommunications System (UMTS) Terrestrial Radio Access Network (E-UTRAN). In an embodiment, the access network 404 includes a plurality of Evolved Node B (eNodeB) base stations connected to UE 402 via an air interface. In one embodiment, the air interface comprises an E-UTRAN Uu or LTE Uu radio air interface. In some embodiments, an E-UTRAN Uu interface utilizes an orthogonal frequency-division multiple access (OFDMA) downlink modulation scheme and a single-carrier frequency-division multiple access (SC-FDMA) uplink modulation scheme. In these embodiments, the eNodeB provides all functionality to implement and operate the air interface and negotiates uplinks and downlinks with the UE 402. The eNodeB may additionally include multiple network interfaces for communicating with the core network 406. In one embodiment, the eNodeB includes an interface to communicate with a mobility manager (e.g., a Mobility Management Entity, MME) and a second interface to communicate with one or more gateway elements in the core network 406, such as an S-GW or P-GW. In one embodiment, the mobility manager manages control plane traffic while the gateway elements manage user data traffic, as will be discussed. In some embodiments, base stations in the access network 404 are communicatively connected. For example, in a 4G network, individual eNodeB devices can be communicatively coupled, for example, via an X2 interface or any other interface.

In some embodiments, the access network 404 may operate in a dual-connectivity mode wherein UE 402 connects to multiple base stations in the access network 404 simultaneously. In some embodiments, dual connectivity may be implemented via New Radio Dual Connectivity (NR-DC), E-UTRA—NR Dual Connectivity (EN-DC), NG-RAN-E-UTRA-NR Dual Connectivity (NGEN-DC), or NR-E-UTRA Dual Connectivity (NE-DC).

In the illustrated embodiment, the access network 404 provides access to a core network 406 to the UE 402. In the illustrated embodiment, the core network may be owned and/or operated by a mobile network operator (MNO) and provides wireless connectivity to UE 402. In the illustrated embodiment, this connectivity may comprise voice and data services. The core network 406 includes various computing devices, which are described briefly herein. Further detail of such devices is provided in FIG. 5.

At a high level, the core network 406 may include a user plane and a control plane. In one embodiment, the control plane comprises network elements and communications interfaces to allow for the management of user connections and sessions. By contrast, the user plane may comprise network elements and communications interfaces to transmit user data from UE 402 to elements of the core network 406 and to external network-attached elements in a data network 408 such as the Internet. An example of a control plane function comprises authenticating that a user can access the core network 406 (i.e., is a subscriber to the MNO). An example of a user plane function is the request and receipt of data from an external web server (e.g., via a web browser on a UE). Many other examples exist in a 4G or 5G network, and the foregoing examples are not intended to be limiting.

Generally, the core network 406 may include a mobility manager, one or more gateways (e.g., a serving gateway and packet gateway), and a subscriber database. In practice, the core network 406 may include more components than these. In a 4G network, the mobility manager may be implemented by an MME, the serving gateway by an S-GW, the packet gateway by a P-GW, and the subscriber database by an HSS. In a 5G network, the mobility manager may be implemented by an Access Mobility Management Function (AMF), Session Management Function (SMF), and an Authentication Server Function (AUSF). Specifically, the AMF performs mobility management while the SMF performs session management, both of which are described herein. Further, the AUSF obtains authentication vectors from a subscriber database. In a 4G network, the Mobility Management Entity (MME) performs all these functions. The 4G serving gateway (S-GW) in a 5G network may be implemented by the SMF as well. Specifically, packet routing from the base station to the packet gateway may be handled by the SMF in contrast to the S-GW in a 4G network. In a 5G network, the packet gateway function user plane may be implemented by the UPF, which provides packet routing from the serving gateway to external services and manages Internet Protocol (IP) address allocation as well as content filtering and blocking. In a 5G network, the subscriber database may be implemented by a UDR, which stores the subscriber data. Access to the UDR may be mediated by a UDM, which is part of the subscriber database, as described herein.

In brief, a UE 402 communicates with the mobility manager to authenticate and establish a session or bearer with the serving and packet gateways. The mobility manager accesses the subscriber data to confirm the UE 402 identity and communicates with the serving gateway to establish the session. Once established, the UE 402 transmits data requests through the session to the packet gateway, which manages the transmitting and receiving data to and from external network services. Specific details of these elements are provided in the following figures.

In the illustrated embodiment, the access network 404 and the core network 406 are operated by an MNO. However, in some embodiments, networks 404, 406 may be operated by a private entity and may be closed to public traffic. For example, the components of the core network 406 may be provided as a single device, and the access network 404 may comprise a small form-factor base station. In these embodiments, the operator of the device can simulate a cellular network, and UE 402 can connect to this network akin to connecting to a national or regional network.

Figure 5:
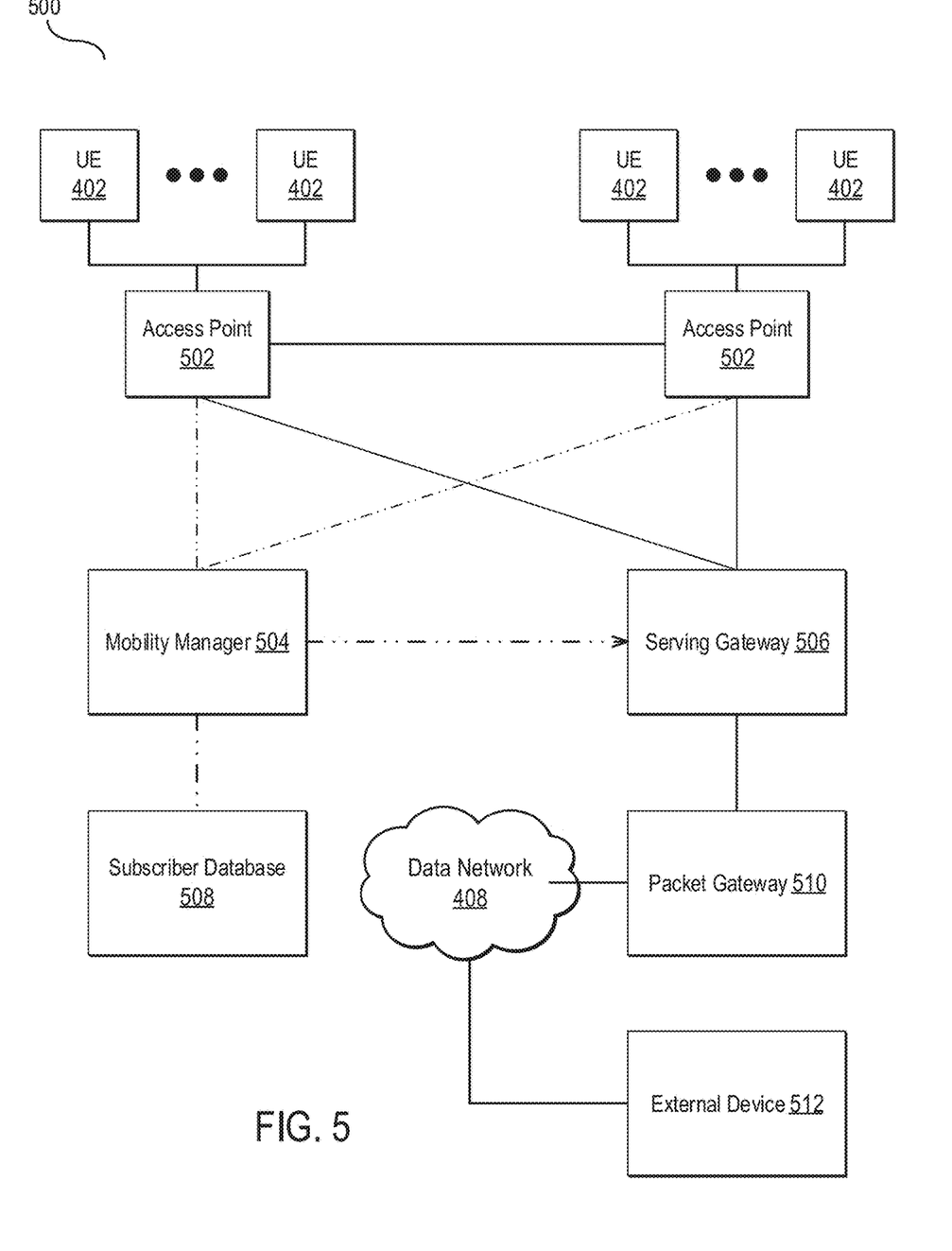
FIG. 5 is a block diagram illustrating a cellular network according to some embodiments.

FIG. 5 is a block diagram illustrating a cellular network according to some embodiments.

In the illustrated embodiment, a system 500 includes UE 402 communicatively connected to access points 502. As seen in FIG. 5, the access points 502 form an access network such as access network 404. In one embodiment, the access points 502 and UE 402 comprise a NextGen Radio Access Network (NG-RAN). In an embodiment, access points 502 comprise a plurality of gNodeB base stations connected to UE 402 via an air interface. In one embodiment, the air interface comprises a New Radio (NR) air interface. The gNodeB additionally includes multiple network interfaces for communicating with the core network and, specifically, mobility manager 504 and serving gateway 506. In one embodiment, the mobility manager 504 in a 5G network comprises an AMF. In one embodiment, the serving gateway 506 comprises an SMF for control data or UPF for user data.

In another embodiment, access points 502 comprise eNodeB base stations connected to UE 402 via an air interface. In some embodiments, the air interface comprises an E-UTRAN Uu or LTE Uu radio air interface. In these embodiments, the eNodeB provides all functionality to implement and operate the air interface and negotiates uplinks and downlinks with the UE 402. The eNodeB additionally includes multiple network interfaces for communicating with the core network and, specifically, mobility manager 504 and serving gateway 506. In one embodiment, the mobility manager 504 comprises an MME in a 4G network. In the illustrated embodiment, solid lines between network elements 504, 506, 508, 510 represent user data traffic, while dashed lines between network elements 504, 506, 508, 510 represent control or Non-Access Stratum (NAS) traffic.

In the illustrated embodiment, the mobility manager 504 manages control plane traffic while the gateway elements 506, 510 manage user data traffic. Specifically, the mobility manager 504 may comprise hardware or software for handling network attachment requests from UE 402. As part of processing these requests, the mobility manager 504 accesses a subscriber database 508. The subscriber database 508 comprises hardware or software that stores user authorization and authentication data and validates users to the network. In some embodiments, the subscriber database 508 may comprise a UDM and UDR in a 5G network. In another embodiment, the subscriber database 508 may comprise an HSS in a 4G network. In one embodiment, the subscriber database 508 may also store a location of the user updated via a Diameter or similar protocol.

The mobility manager 504 may also be configured to create data sessions or bearers between UE 402 and serving gateway 506 or gateway 510. In one embodiment, the serving gateway 506 and gateway 510 may comprise single or separate devices. In general, the serving gateway 506 routes and forwards user data packets while also acting as the mobility anchor for the user plane during access point handovers and as the anchor for mobility between different network technologies. For idle state UE 402, the serving gateway 506 terminates the downlink data path and triggers paging when downlink data arrives for the UE 402. The serving gateway 506 manages and stores UE 402 contexts, e.g., parameters of the IP bearer service, network internal routing information. In a 5G network, the serving gateway 506 may be implemented by an SMF. In a 4G network, the serving gateway 506 may be implemented by an S-GW.

The serving gateway 506 is communicatively coupled to a gateway 510. In general, the gateway 510 provides connectivity from the UE 402 to external Packet Data Networks (PDNs) such as data network 408 by being the point of exit and entry of traffic to external networks (e.g., 408). UE 402 may have simultaneous connectivity with plurality gateways, including gateway 510 for accessing multiple packet data networks. The gateway 510 performs policy enforcement, packet filtering for each user, charging support, lawful interception, and packet screening. In the illustrated embodiment, gateway 510 also limits access to endpoints such as an external device 512. In a 5G network, the gateway 510 may be implemented by a UPF. In a 4G network, the gateway 510 may be implemented by a P-GW.

In the illustrated embodiment, an external device 512 is communicatively coupled to the core network via the data network 408. In one embodiment, the data network 408 may comprise the Internet. In the illustrated embodiment, the external device 512, such as an application server, may comprise any electronic device capable of communicating with the data network 408, and the disclosure is not limited to specific types of network devices.

Figure 6:
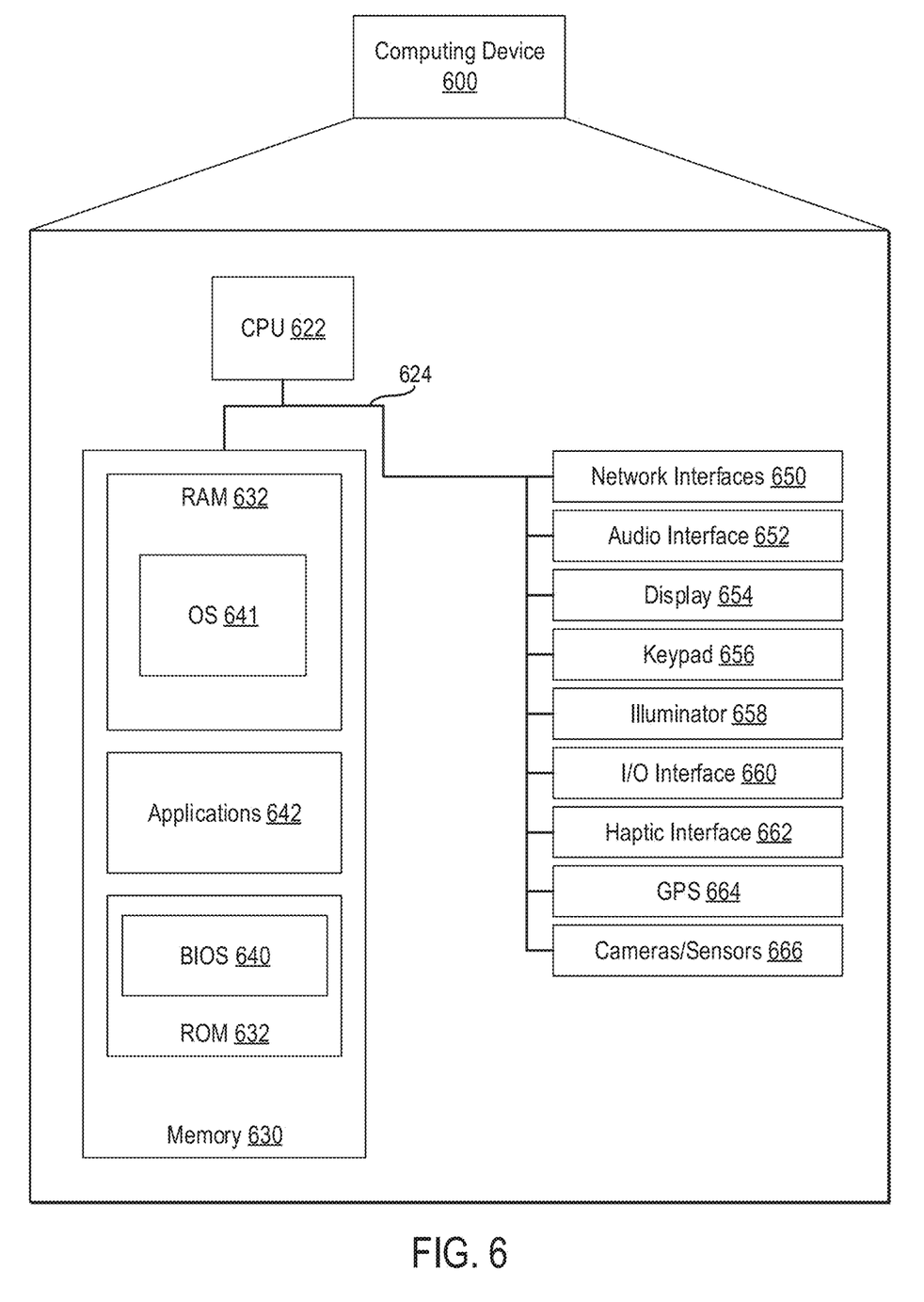
FIG. 6 is a block diagram illustrating a computing device showing an example of a client or server device used in the various embodiments of the disclosure.

FIG. 6 is a block diagram illustrating a computing device showing an example of a client or server device used in the various embodiments of the disclosure.

The computing device 600 may include more or fewer components than those shown in FIG. 6, depending on the deployment or usage of the computing device 600. For example, a server computing device, such as a rack-mounted server, may not include an audio interface 652, display 654, keypad 656, illuminator 658, haptic interface 662, Global Positioning System (GPS) receiver such as GPS receiver 664, or cameras/sensors 666. Some devices may include additional components not shown, such as graphics processing unit (GPU) devices, cryptographic co-processors, artificial intelligence (AI) accelerators, or other peripheral devices.

As shown in the figure, the computing device 600 includes a central processing unit (CPU) 622 in communication with a mass memory 630 via a bus 624. The computing device 600 also includes a network interface 650, an audio interface 652, a display 654, a keypad 656, an illuminator 658, an input/output interface (660), a haptic interface 662, a GPS receiver 664, and a camera(s) or other optical, thermal, or electromagnetic cameras/sensors 666. The computing device 600 can include a plurality of cameras/sensors 666. The positioning of the cameras/sensors 666 on the computing device 600 can change per computing device 600 model, per computing device 600 capabilities, and the like, or some combination thereof.

In some embodiments, the CPU 622 may comprise a general-purpose CPU. The CPU 622 may comprise a single-core or multiple-core CPU. The CPU 622 may comprise a system-on-a-chip (SoC) or a similar embedded system. In some embodiments, a GPU may be used in place of, or in combination with, a CPU 622. Mass memory 630 may comprise a dynamic random-access memory (DRAM) device, a static random-access memory device (SRAM), or a Flash (e.g., NAND Flash) memory device. In some embodiments, mass memory 630 may comprise a combination of such memory types. In one embodiment, the bus 624 may comprise a Peripheral Component Interconnect Express (PCIe) bus. In some embodiments, bus 624 may comprise multiple busses instead of a single bus.

Mass memory 630 illustrates another example of computer storage media for the storage of information such as computer-readable instructions, data structures, program modules, or other data. Mass memory 630 stores a basic input/output system, BIOS 640, for controlling the low-level operation of the computing device 600. The mass memory also stores an operating system 641 for controlling the operation of the computing device 600.

Applications 642 may include computer-executable instructions which, when executed by the computing device 600, perform any of the methods (or portions of the methods) described previously in the description of the preceding Figures. In some embodiments, the software or programs implementing the method embodiments can be read from a hard disk drive (not illustrated) and temporarily stored in RAM 632 by CPU 622. CPU 622 may then read the software or data from RAM 632, process them, and store them in RAM 632 again.

The computing device 600 may optionally communicate with a base station (not shown) or directly with another computing device. Network interface 650 is sometimes known as a transceiver, transceiving device, or network interface card (NIC).

The audio interface 652 produces and receives audio signals such as the sound of a human voice. For example, the audio interface 652 may be coupled to a speaker and microphone (not shown) to enable telecommunication with others or generate an audio acknowledgment for some action. Display 654 may be a liquid crystal display (LCD), gas plasma, light-emitting diode (LED), or any other type of display used with a computing device. Display 654 may also include a touch-sensitive screen arranged to receive input from an object such as a stylus or a digit from a human hand.

Keypad 656 may comprise any input device arranged to receive input from a user. Illuminator 658 may provide a status indication or provide light.

The computing device 600 also comprises an input/output interface (660) for communicating with external devices, using communication technologies, such as USB, infrared, Bluetooth™, or the like. The haptic interface 662 provides tactile feedback to a user of the client device.

The GPS receiver 664 can determine the physical coordinates of the computing device 600 on the surface of the Earth, which typically outputs a location as latitude and longitude values. GPS receiver 664 can also employ other geo-positioning mechanisms, including, but not limited to, triangulation, assisted GPS (AGPS), E-OTD, CI, SAI, ETA, BSS, or the like, to further determine the physical location of the computing device 600 on the surface of the Earth. In one embodiment, however, the computing device 600 may communicate through other components, provide other information that may be employed to determine the physical location of the device, including, for example, a MAC address, IP address, or the like.

The present disclosure has been described with reference to the accompanying drawings, which form a part hereof, and which show, by way of non-limiting illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, the reasonably broad scope for claimed or covered subject matter is intended. Among other things, for example, the subject matter may be embodied as methods, devices, components, or systems. Accordingly, embodiments may, for example, take the form of hardware, software, firmware, or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in some embodiments" as used herein does not necessarily refer to the same embodiment, and the phrase "in another embodiment" as used herein does not necessarily refer to a different embodiment. It is intended, for example, that claimed subject matter includes combinations of example embodiments in whole or in part.

In general, terminology may be understood at least in part from usage in context. For example, terms such as "and," "or," or "and/or," as used herein may include a variety of meanings that may depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms, such as "a," "an," or "the," again, can be understood to convey a singular usage or to convey a plural usage, depending at least in part upon context. In addition, the term "based on" may be understood as not necessarily intended to convey an exclusive set of factors and may, instead, allow for the existence of additional factors not necessarily expressly described, again, depending at least in part on context.

The present disclosure has been described with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general-purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur in different orders than illustrated. For example, two blocks shown in succession can, in fact, be executed substantially concurrently, or the blocks can sometimes be executed in the reverse order, depending upon the functionality/acts involved.

For the purposes of this disclosure, a non-transitory computer-readable medium (or computer-readable storage medium/media) stores computer data, which data can include computer program code (or computer-executable instructions) that is executable by a computer, in machine-readable form. By way of example, and not limitation, a computer-readable medium may comprise computer-readable storage media for tangible or fixed storage of data or communication media for transient interpretation of code-containing signals. Computer-readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer-readable storage media includes, but is not limited to, RAM, ROM, EPROM, EEPROM, flash memory or other solid-state memory technology, CD-ROM, DVD, or other optical storage, cloud storage, magnetic cassettes, magnetic tape, magnetic disk storage, or other magnetic storage devices, or any other physical or material medium which can be used to tangibly store the desired information or data or instructions and which can be accessed by a computer or processor.

In the preceding specification, various example embodiments have been described with reference to the accompanying drawings. However, it will be evident that various modifications and changes may be made thereto, and additional embodiments may be implemented without departing from the broader scope of the disclosed embodiments as set forth in the claims that follow. The specification and drawings are accordingly to be regarded in an illustrative rather than restrictive sense.

We claim:

1. A method comprising:
    receiving a request to attach to a cellular network from user equipment (UE);
    identifying a group identifier based on an identity of the UE, the group identifier comprising a Subscriber Profile Identifier (SPID) when the UE operates in a non-standalone mode and a Single Network Slice Selection Assistance Information (S-NSSAI) when the UE operates in a standalone mode, the group identifier being the same in both the non-standalone mode and the standalone mode;
    determining a discontinuous reception (DRX) parameter based on the group identifier; and
    transmitting the DRX parameter to the UE.

2. The method of claim 1, wherein the DRX parameter comprises an idle-mode DRX parameter.

3. The method of claim 1, further comprising obtaining a QoS Class Identifier (QCI) value associated with the UE.

4. The method of claim 3, wherein determining the DRX parameter comprises determining the DRX parameter based on the group identifier and the QCI value.

5. The method of claim 4, wherein the DRX parameter comprises a connected mode DRX parameter.

6. The method of claim 1, wherein identifying the group identifier associated with the UE comprises mapping a unique identifier of the UE to the group identifier.

7. The method of claim 1, wherein identifying the group identifier comprises transmitting a request for the group identifier to a subscriber management component and receiving the group identifier from the subscriber management component.

8. The method of claim 1, wherein mapping a unique identifier of the UE to the group identifier comprises grouping a subset of alphanumeric characters of the unique identifier to a group identifier.

9. A non-transitory computer-readable storage medium for storing instructions executable by a processor, the instructions comprising:
receiving a request to attach to a cellular network from user equipment (UE);
identifying a group identifier based on an identity of the UE, the group identifier comprising a Subscriber Profile Identifier (SPID) when the UE operates in a non-standalone mode and a Single Network Slice Selection Assistance Information (S-NSSAI) when the UE operates in a standalone mode, the group identifier being the same in both the non-standalone mode and the standalone mode;
determining a discontinuous reception (DRX) parameter based on the group identifier; and
transmitting the DRX parameter to the UE.

10. The non-transitory computer-readable storage medium of claim 9, wherein the DRX parameter comprises an idle-mode DRX parameter.

11. The non-transitory computer-readable storage medium of claim 9, further comprising obtaining a QoS Class Identifier (QCI) value associated with the UE.

12. The non-transitory computer-readable storage medium of claim 11, wherein determining the DRX parameter comprises determining the DRX parameter based on the group identifier and the QCI value.

13. The non-transitory computer-readable storage medium of claim 12, wherein the DRX parameter comprises a connected mode DRX parameter.

14. The non-transitory computer-readable storage medium of claim 9, wherein identifying the group identifier associated with the UE comprises mapping a unique identifier of the UE to the group identifier.

15. A device comprising:
a processor configured to:
receive a request to attach to a cellular network from user equipment (UE);
identify a group identifier based on an identity of the UE, the group identifier comprising a Subscriber Profile Identifier (SPID) when the UE operates in a non-standalone mode and a Single Network Slice Selection Assistance Information (S-NSSAI) when the UE operates in a standalone mode, the group identifier being the same in both the non-standalone mode and the standalone mode;
determine a discontinuous reception (DRX) parameter based on the group identifier; and
transmit the DRX parameter to the UE.

16. The device of claim 15, wherein the DRX parameter comprises an idle-mode DRX parameter.

17. The device of claim 15, further comprising obtaining a QoS Class Identifier (QCI) value associated with the UE.

18. The device of claim 17, wherein determining the DRX parameter comprises determining the DRX parameter based on the group identifier and the QCI value.

19. The device of claim 18, wherein the DRX parameter comprises a connected mode DRX parameter.

20. The device of claim 15, wherein identifying the group identifier associated with the UE comprises mapping a unique identifier of the UE to the group identifier.

* * * * *